(12) United States Patent
Kwon et al.

(10) Patent No.: US 8,988,605 B2
(45) Date of Patent: Mar. 24, 2015

(54) DISPLAY APPARATUS AND CONTROL METHOD THEREOF

(71) Applicant: Samsung Electronics Co., Ltd., Suwon-si (KR)

(72) Inventors: Oh-yun Kwon, Seoul (KR); Dae-hyun Nam, Anyang-si (KR); Byung-jo Jun, Seongnam-si (KR); Young-chan Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/245,520

(22) Filed: Apr. 4, 2014

(65) Prior Publication Data

US 2015/0049246 A1    Feb. 19, 2015

(30) Foreign Application Priority Data

Aug. 16, 2013    (KR) ........................ 10-2013-0097394

(51) Int. Cl.
*H04N 7/00*    (2011.01)
*H04N 5/04*    (2006.01)
*H04N 5/445*    (2011.01)

(52) U.S. Cl.
CPC ............. *H04N 5/04* (2013.01); *H04N 5/44513* (2013.01); *H04N 2005/4453* (2013.01)
USPC ............................ 348/464; 348/465; 348/468

(58) Field of Classification Search
USPC ......... 348/464, 465, 468, 462, 589, 600, 569, 348/563, 564; 725/32–34, 36, 42, 82, 91, 725/114, 151, 139, 131, 100, 85, 68, 67
IPC .................. H04N 7/00,11/00, 9/74, 9/76, 5/50, H04N 5/445
See application file for complete search history.

(56) References Cited

U.S. PATENT DOCUMENTS

| 5,543,851 | A | 8/1996 | Chang | |
|---|---|---|---|---|
| 2006/0044469 | A1* | 3/2006 | Kim et al. ...................... | 348/515 |
| 2009/0244372 | A1 | 10/2009 | Petronelli et al. | |
| 2010/0106482 | A1 | 4/2010 | Hardacker et al. | |
| 2011/0231180 | A1 | 9/2011 | Padi et al. | |
| 2012/0176540 | A1* | 7/2012 | Labrozzi et al. .............. | 348/468 |

FOREIGN PATENT DOCUMENTS

| WO | 03/081917 A1 | 10/2003 |
|---|---|---|
| WO | 2009/023120 A2 | 2/2009 |

OTHER PUBLICATIONS

Communication dated Jan. 26, 2015 issued by the European Patent Office in counterpart European Application No. 14159547.0.

* cited by examiner

*Primary Examiner* — Sherrie Hsia
(74) *Attorney, Agent, or Firm* — Sughrue Mion, PLLC (57) ABSTRACT

Disclosed are a display apparatus and a method of controlling the display apparatus, the display apparatus including: a signal receiver which receives a signal containing video data for displaying a series of frames; a first data extractor which extracts first caption data from the signal; a data acquirer which acquires second caption data from the extracted first caption data; a second data extractor which extracts the video data from the signal; a buffering section which buffers the extracted video data; a synchronizer which synchronizes the acquired second caption data with frames corresponding to relevant caption data among frames of the buffered video data; and a display which displays the frame synchronized with the second caption data.

16 Claims, 8 Drawing Sheets

DISPLAY APPARATUS AND CONTROL METHOD THEREOF

CROSS-REFERENCE TO RELATED APPLICATION

This application claims priority from Korean Patent Application No. 10-2013-0097394, filed on Aug. 16, 2013 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly to a display apparatus and a control method thereof, in which a caption is displayed and synchronized with an image or a sound.

2. Description of the Related Art

A display apparatus, such as a television (TV), processes a received signal and outputs an image and sound. The received signal may contain a subtitle, a translation or other captioning. The display apparatus may extract the caption from the received signal and provide the caption while synchronizing it with the image or the sound.

However, for example, in terms of processing a translation or the like caption, it may take time to process the caption because caption data processed by translating the caption data extracted from the received signal may be needed. Such time taken in processing the caption may cause the caption to be delayed and thus not properly synchronized with the image or the sound. In particular, if an external server is used for processing the caption, it may take much time in communication using the network and therefore the delay of the caption will become a serious problem.

Meanwhile, the display apparatus may receive a signal through a connected set-top box. In this case, the caption is not included in encoded caption data but rather, is simply contained in the image. Therefore, in this case, it is impossible to decode and extract the caption data from the signal, and another method is needed to extract the caption. If another method is employed for extracting the caption, it will take more time to process the caption, thereby causing a problem.

SUMMARY

One or more exemplary embodiments may provide a display apparatus and a control method thereof, in which a caption can be exactly synchronized with an image or a sound even though it takes time to process the caption.

According to an aspect of an exemplary embodiment, a display apparatus includes: a signal receiver which receives a signal containing video data for displaying a series of frames; a first data extractor which extracts first caption data from the signal; a data acquirer which acquires second caption data from the extracted first caption data; a second data extractor which extracts the video data from the signal; a buffering section which buffers the extracted video data; a synchronizer which synchronizes the acquired second caption data with frames corresponding to relevant caption data among frames of the buffered video data; and a display which displays the frame synchronized with the second caption data.

The data acquirer may include a communicator which transmits the first caption data to a server connected through a network, and receives the second caption data from the server.

The signal may include the encoded first caption data, and the first data extractor may include a caption decoder which decodes the encoded first caption data and extracts the first caption data.

The first data extractor may include a character recognizer which recognizes the first caption data in the frames of the video data.

The second caption data may include translation data of the first caption data.

The signal receiver may include a tuner to receive a broadcasting signal corresponding to one among a plurality of channels.

The signal receiver may include a connector connected to a set-top box and receiving the signal from the set-top box.

The display apparatus may further include a sound output section which synchronizes and outputs a sound corresponding to the first caption data with the frames.

According to an aspect of another exemplary embodiment, a method of controlling a display apparatus is provided, the method including: receiving a signal containing video data for displaying a series of frames; extracting first caption data from the signal; acquiring second caption data from the extracted first caption data; extracting the video data from the signal; buffering the extracted video data; synchronizing the acquired second caption data with frames corresponding to relevant caption data among frames of the buffered video data, and displaying the synchronized frame.

The acquiring the second caption data may include: transmitting the first caption data to a server connected through a network; and receiving the second caption data from the server.

The signal may include the encoded first caption data, and the extracting the first caption data may include decoding the encoded first caption data and extracting the first caption data.

The extracting the first caption data may include recognizing the first caption data in the frames of the video data.

The second caption data may include translation data of the first caption data.

The receiving the signal may include receiving a broadcasting signal corresponding to one among a plurality of channels.

The receiving the signal may include receiving the signal from a set-top box connected to the display apparatus.

The method may further include synchronizing and outputting a sound corresponding to the first caption data with the frames.

According to an aspect of another exemplary embodiment, a method of displaying video data is provided, the method including: receiving a signal comprising video data and first caption data, wherein the first caption data is data of a first caption; using the first caption data to acquire second caption data, wherein the second caption data is data of a translation of the first caption; synchronizing the second caption data with one or more frames of the video data; and displaying the second caption data simultaneously with the one or more frames.

The method may further include: synchronizing a sound corresponding to the second caption data and the one or more frames; and outputting the sound simultaneously with the displaying the second caption data with the one or more frames.

BRIEF DESCRIPTION OF THE DRAWINGS

The above and/or other exemplary aspects and advantages will become apparent and more readily appreciated from the following description of exemplary embodiments, taken in conjunction with the accompanying drawings, in which.

DETAILED DESCRIPTION OF EXEMPLARY EMBODIMENTS

Figure 1:
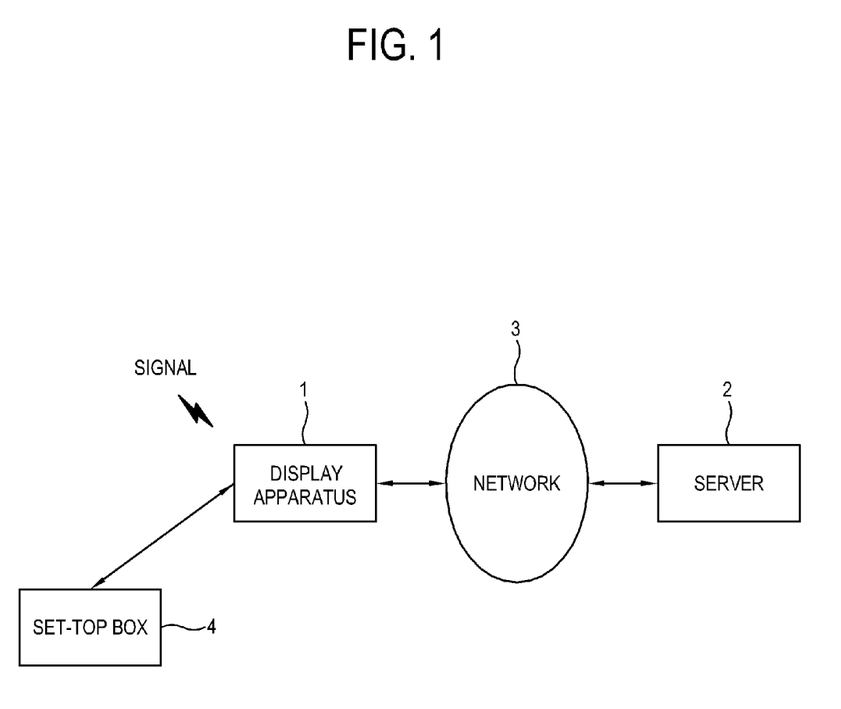
FIG. 1 shows a display apparatus according to an exemplary embodiment.

Below, exemplary embodiments will be described in detail. FIG. 1 shows a display apparatus according to an exemplary embodiment. A display apparatus 1 may be a television (TV). The display apparatus 1 receives a signal, and processes it to output an image and/or sound. The signal includes a TV broadcasting signal. The display apparatus 1 may receive the signal directly, or receive the signal from a set-top box 4 connected to the display apparatus 1.

Figure 2:
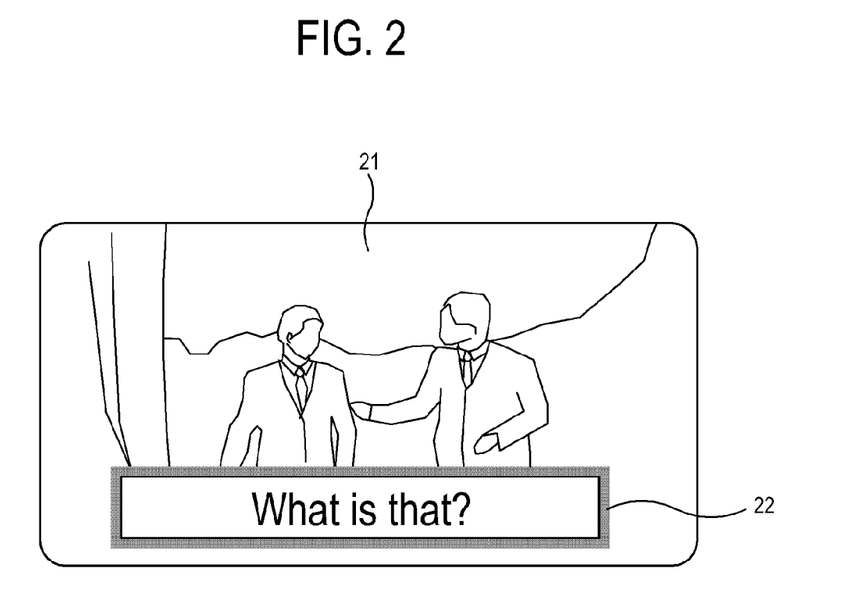
FIG. 2 shows an example of a caption contained in a signal according to an exemplary embodiment.

The signal includes a caption. The caption may be additional information related to the image or sound, and may, for example, include a subtitle for the image or sound. FIG. 2 shows an example of a caption contained in a signal according to an exemplary embodiment. As shown in FIG. 2, the caption contained in the received signal may include a subtitle 22 for the image 21. Alternatively, the caption may include independent information unrelated to the image 21 or its sound.

Figure 3:
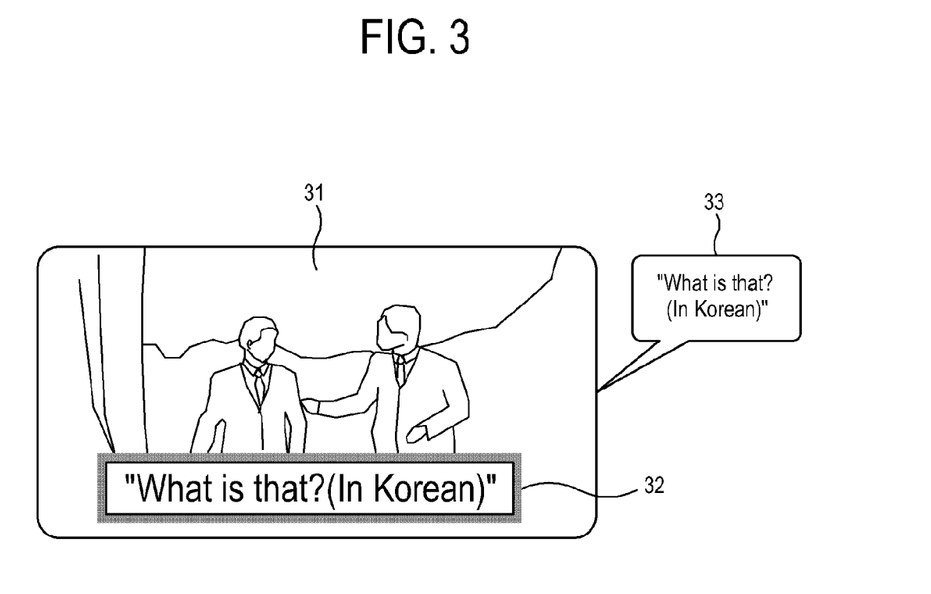
FIG. 3 shows an example of a caption output by a display apparatus according to an exemplary embodiment.

The display apparatus 1 extracts the caption (hereinafter, referred to as 'first caption data') from the received signal. The display apparatus 1 acquires second caption data from the extracted first caption data. That is, the second caption data is data obtained by processing the first caption data. For example, the second caption data may be a translation of the first caption data. The display apparatus 1 synchronizes the second caption data with the corresponding image or sound and outputs it. FIG. 3 shows an example of a caption (i.e., the second caption data) output by the display apparatus 1 according to an exemplary embodiment. As shown in FIG. 3, the caption (i.e., the second caption data) output by the display apparatus 1 may be a translation 32 of the subtitle (i.e., the first caption data) of the image 31.

The display apparatus 1 may acquire the second caption data from internal processing, or from external processing. In the latter case, for example, as shown in FIG. 1, the display apparatus 1 can acquire the second caption data from a server 2 through a network 3. The network 3 includes a wired network and/or a wireless network. The server 2 may, for example, include an Internet server. The display apparatus 1 may transmit the extracted first caption data to the server 2, and receive the second caption data from the server 2. The server 2 processes the first caption data received from the display apparatus 1 and thus generates the second caption data. For example, the server 2 is a translation server including translation information, generates the second caption data translated from the first caption data, and provides the generated second caption data to the display apparatus 1.

The display apparatus 1 synchronizes the second caption data with the corresponding image or sound and outputs the second caption data. Specifically, the display apparatus 1 buffers data of the image or data of the sound (hereinafter, referred to as 'the video data' and 'the sound data', respectively) extracted from the received signal, and synchronizes the second caption data acquired from the buffered video data or sound data with the corresponding video data or sound data when the second caption data is acquired, thereby outputting the synchronized data. Therefore, it is possible to exactly synchronize the corresponding second caption data with the relevant image or sound even though time is taken in acquiring the second caption data. Hereinafter, for convenience of description, the video data will be representatively described between the video data and sound data to be synchronized with the second caption data.

The display apparatus 1 may output the sound corresponding to the second caption data along with the second caption data. That is, referring back to FIG. 3, the display apparatus 1 may output both the second caption data 32, translated from the subtitle of the image 31, and the sound 33 corresponding to the second caption data 32. For example, in FIG. 3, the display apparatus 1 may output the caption "What is that? (In Korean" 32, translated from the subtitle "What is that?" 22 of FIG. 2 and the sound "What is that? (In Korean)" 33 corresponding to the caption 32. Thus, a user can be provided with a translation of a subtitle not only visually but also acoustically, for more convenience for the user.

Figure 4:
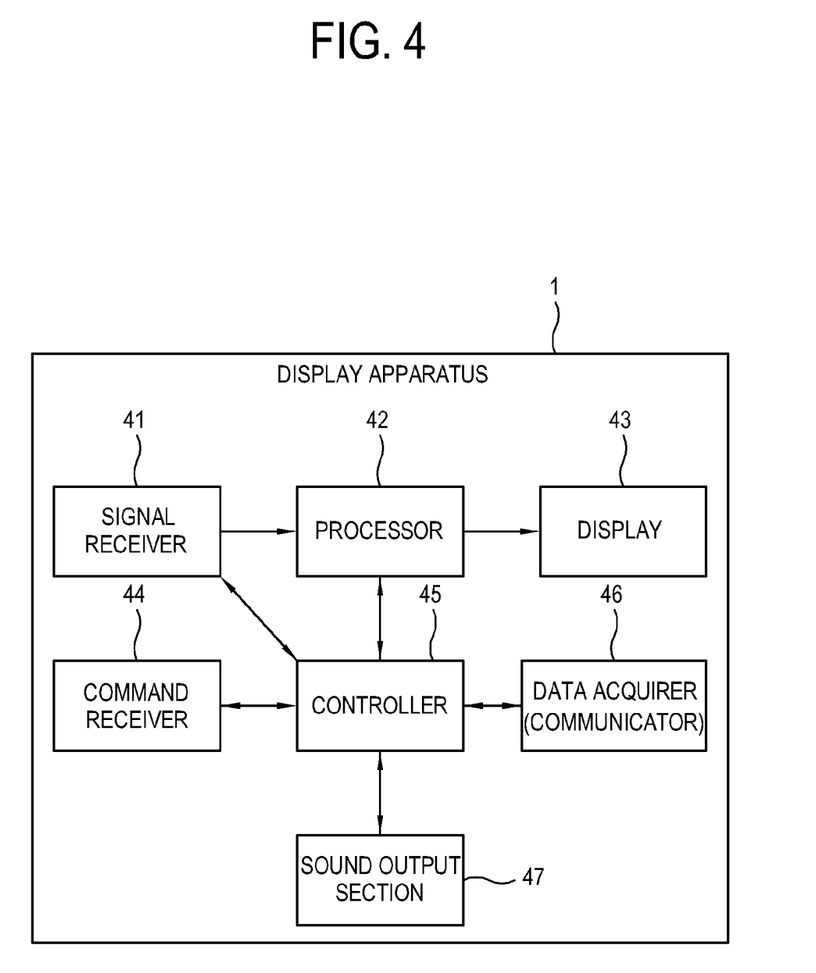
FIG. 4 is a block diagram showing elements of a display apparatus according to an exemplary embodiment.

FIG. 4 is a block diagram showing elements of the display apparatus 1 according to an exemplary embodiment. The display apparatus 1 includes a signal receiver 41, a processor 42, a display 43, a command receiver 44, a controller 45, a data acquirer 46 and a sound output section 47. The elements of the display apparatus 1 shown in FIG. 4 are exemplary, and may vary as necessary. That is, although it is not shown, at least one of the elements constituting the display apparatus 1 shown in FIG. 4 may be excluded, or another element may be added.

The signal receiver 41 receives an image and/or a sound, and a signal containing a caption. The signal receiver 41 includes a tuner to receive a broadcasting signal. The tuner may be tuned to one channel selected among a plurality of channels and may receive a broadcasting signal from the tuned channel under control of the controller 45. The tuned channel may be selected by a user. The command receiver 44 receives a user's command about the selection of the channel and transmits it to the controller 45. The command receiver 44 may include a control panel to receive a user's command, or include a remote controller signal receiver to receive a remote controller signal containing a user's command from a remote controller.

Alternatively, the signal receiver 41 may include a connector connected to a set-top box 4 shown in FIG. 1. The connector may request the set-top box 4 to transmit the signal and may receive the requested signal from the set-top box 4 under control of the controller 45. In this case, the signal of one channel selected among the plurality of channels may be received.

Figure 5:
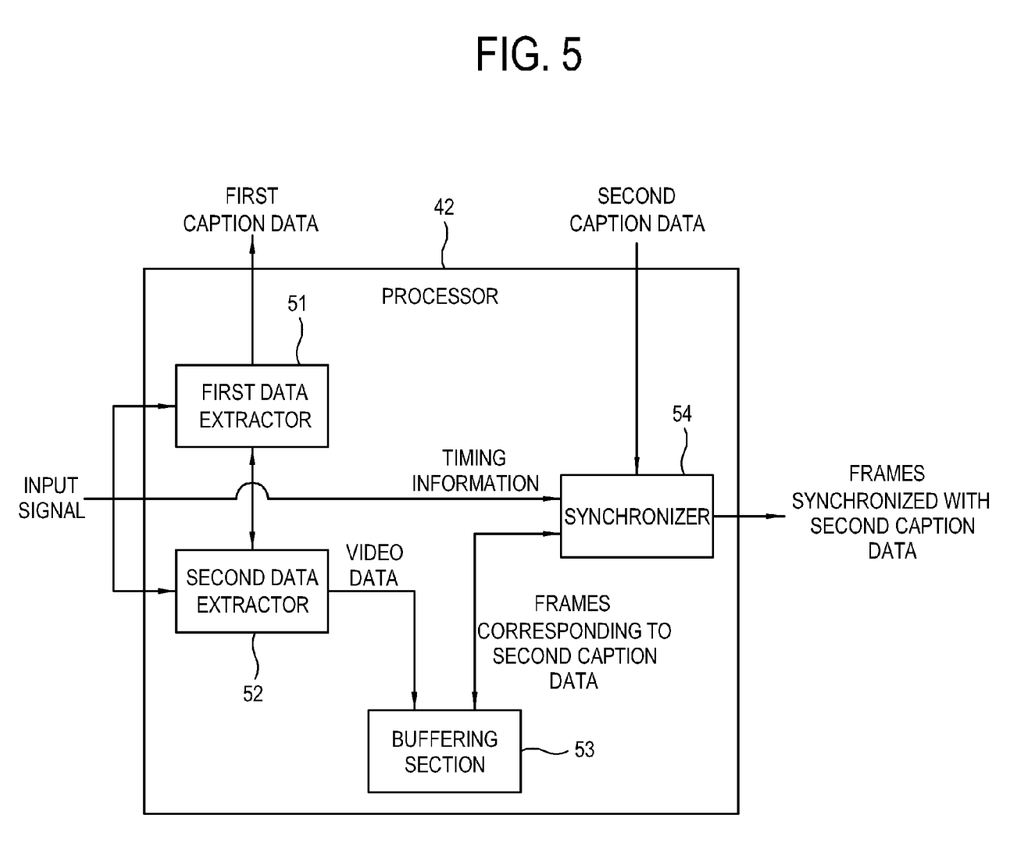
FIG. 5 is a block diagram showing elements of a processor according to an exemplary embodiment.

The processor 42 processes a signal (hereinafter, referred to as an 'input signal') input from the signal receiver 41. FIG. 5 is a block diagram showing elements of the processor 42 according to an exemplary embodiment. The processor 42 may include a first data extractor 51, a second data extractor 52, a buffering section 53, and a synchronizer 54. However, the elements of the processor 42 shown in FIG. 5 are exemplary, and may vary as necessary. That is, at least one of the elements constituting the processor 42 shown in FIG. 5 may be excluded, or another element may be added.

Figure 6:
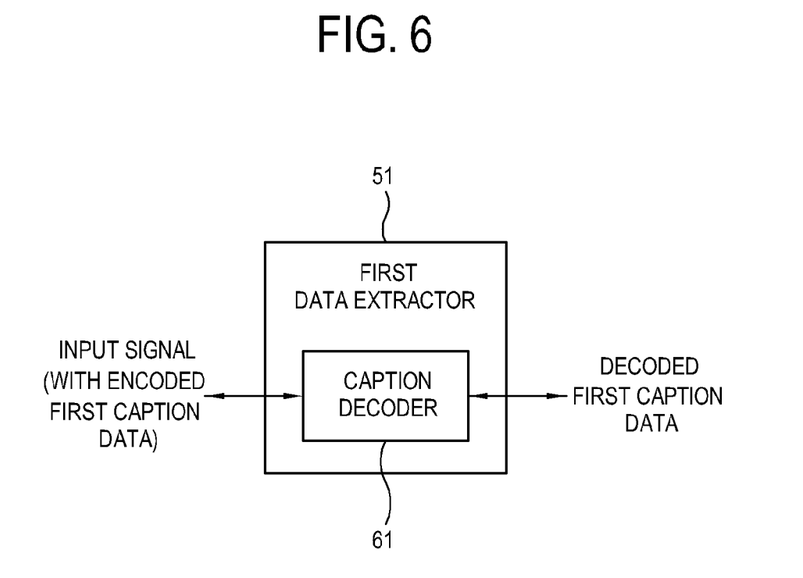
FIGS. 6 and 7 are block diagrams showing elements of first data extractors according to exemplary embodiments.

The first data extractor 51 extracts the first caption data from the input signal. FIGS. 6 and 7 are block diagrams showing elements of first data extractors 51 according to exemplary embodiments. First, as shown in FIG. 6, the first data extractor 51 may include a caption decoder 61. In this case, the input signal may contain encoded first caption data. For example, if the tuner of the signal receiver 41 is tuned and receives the broadcasting signal, the broadcasting signal may include encoded first caption data. The caption decoder 61 decodes the encoded first caption data and outputs the decoded first caption data.

Figure 7:
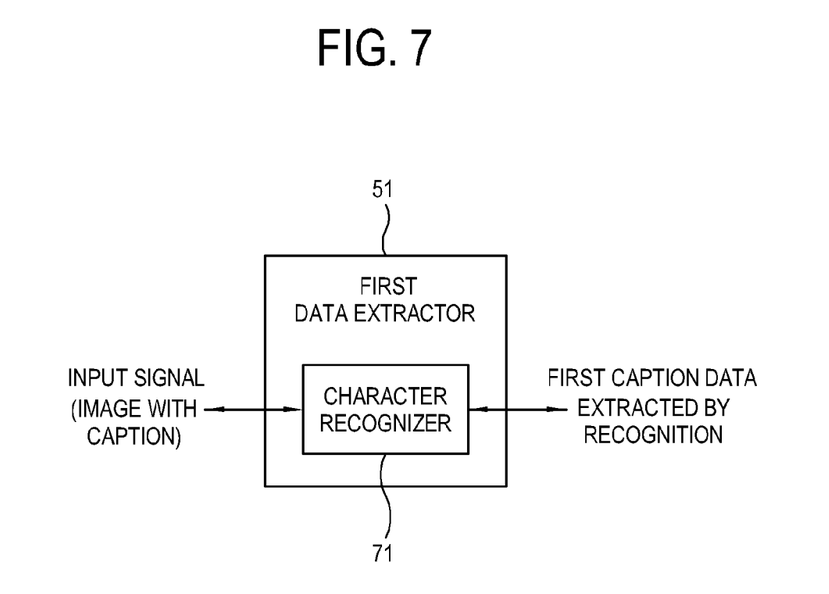

Alternatively, as shown in FIG. 7, the first data extractor 51 may include a character recognizer 71. In this case, the caption may be contained in the image of the input signal. For example, if the signal is received from the set-top box 4 of the signal receiver 41, the caption may be contained in the image. The character recognizer 71 recognizes the caption contained in the image and extracts the first caption data, thereby outputting the extracted first caption data. The first data extractor 51 may receive the video data for recognizing the caption from the second data extractor 52. For example, the character recognizer 71 may employ an optical character recognition (OCR) method to recognize the caption.

Referring back to FIG. 5, the second data extractor 52 extracts the video data from the input signal. The first data extractor 51 and the second data extractor 52 may operate concurrently. The buffering section 53 buffers the video data extracted by the second data extractor 52. Further, the buffering section 53 may buffer the video data per frame of the image.

Referring to FIG. 4, the data acquirer 46 acquires the second caption data from the first caption data extracted by the first data extractor 51. The data acquirer 46 may include a communicator for communicating with the server 2 through the network 3. The data acquirer 46 transmits the first caption data to the server 2, and requests the server 2 to transmit the second caption data. If the server 2 generates the second caption data corresponding to the first caption data, the data acquirer 46 receives the second caption data from the server 2. Alternatively, the data acquirer 46 may directly process the first caption data so as to acquire the second caption data. For example, if the first caption data is a subtitle, the data acquirer 46 may include translation information to generate the second caption data of a translation corresponding to the first caption data.

Referring back to FIG. 5, the synchronizer 54 synchronizes the second caption data acquired by the data acquirer 46 with one or more frames of the image (hereinafter, referred to as "frames"). The synchronizer 54 selects frames corresponding to the received second caption data among the frames buffered by the buffering section 53 from the buffering section 53. The synchronizer 54 may determine the frames corresponding to the second caption data, based on timing information contained in the input signal. The timing information employed in the synchronizer 54 may for example include presentation time stamp (PTS) information contained in a packetized elementary streams (PES) header extracted from video PES if the signal complies with moving picture experiments group (MPEG)2-transport stream (TS) standards. The synchronizer 54 refers to the PTS information to determine the frames to which the first caption data from which the corresponding second caption data is acquired belongs, and synchronizes the determined frames with the second caption data.

Figure 8:
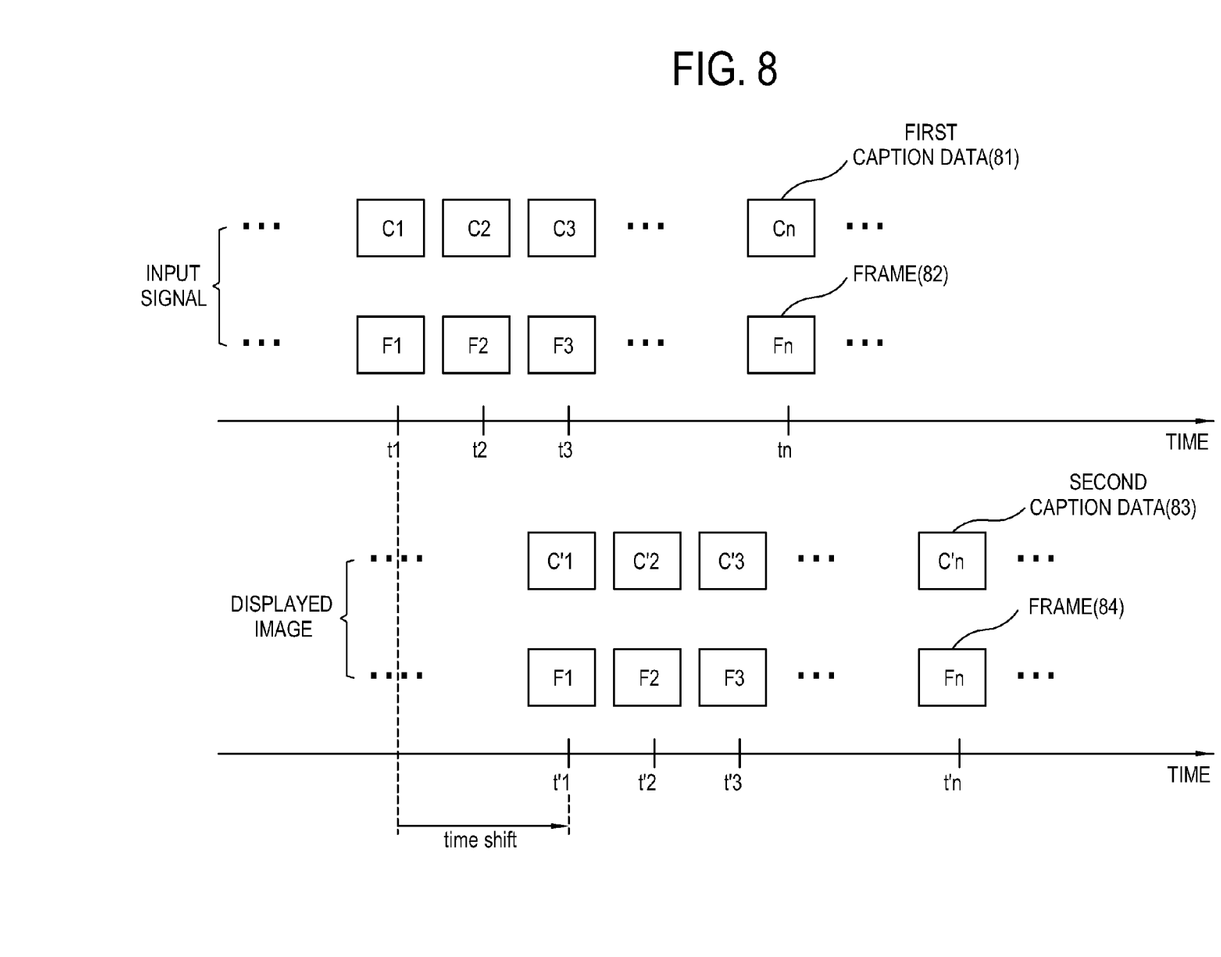
FIG. 8 shows that second caption data and frames are synchronized according to an exemplary embodiment.

FIG. 8 shows that second caption data and frames are synchronized according to an exemplary embodiment. As shown in FIG. 8, the input signal contains the frames 82 of the image, and the first caption data 81. The frames 82 and the first caption data 81 correspond to each other in order of time t1, t2, . . . tn. While the frames 82 are buffered by the buffering section 53, the first caption data 81 is converted into the second caption data 83 by the data acquirer 46. The second caption data 83 is synchronized with the corresponding frames 84 in order of shifted time t'1, t'2, . . . t'n and displayed as an image. Therefore, according to an exemplary embodiment, the time shift is used to exactly synchronize the second caption data with the corresponding frame even though time is taken in acquiring the second caption data.

Referring back to FIG. 4, the display 43 displays an image of the frames synchronized with the second caption data. For example, as shown in FIG. 3, the display 43 may display both the image 31 of the frames and the second caption data 32 of a subtitle translation synchronized with the image 31. The display 43 may be achieved in various types, and may for example include a liquid crystal display (LCD), a plasma display panel (PDP), an organic light emitting diode (OLED), etc.

The sound output section 47 may output a sound corresponding to the second caption data under control of the controller 45. For example, as shown in FIG. 3, the sound output section 47 may output the sound 33 corresponding to the second caption data 32 of the subtitle translation. The sound output section 47 may synchronize the sound 33 with the frames 31 of the image and output the synchronized sound. The sound output section 47 may include a sound processor for processing the sound, and a loud speaker for outputting the processed sound. The sound processor converts the second caption data into the sound. For example, the sound processor may use a text-to-speech (TTS) method to convert the second caption data having a text form into the sound.

The controller 45 generally controls the elements of the display apparatus 1. The controller 45 may include a non-volatile memory for storing a control program, a volatile memory for loading at least a part of the control program, and a microprocessor for executing the control program. The controller 45 may set up and change settings about the caption in accordance with a user's command. For example, the controller 45 may set up the caption to be on/off, the second caption data to be displayed solely, or the first caption data and the second caption data to be displayed concurrently, and so on. Also, the controller 45 may set up the sound output for the second caption data to be on/off in accordance with a user's command.

Figure 9:
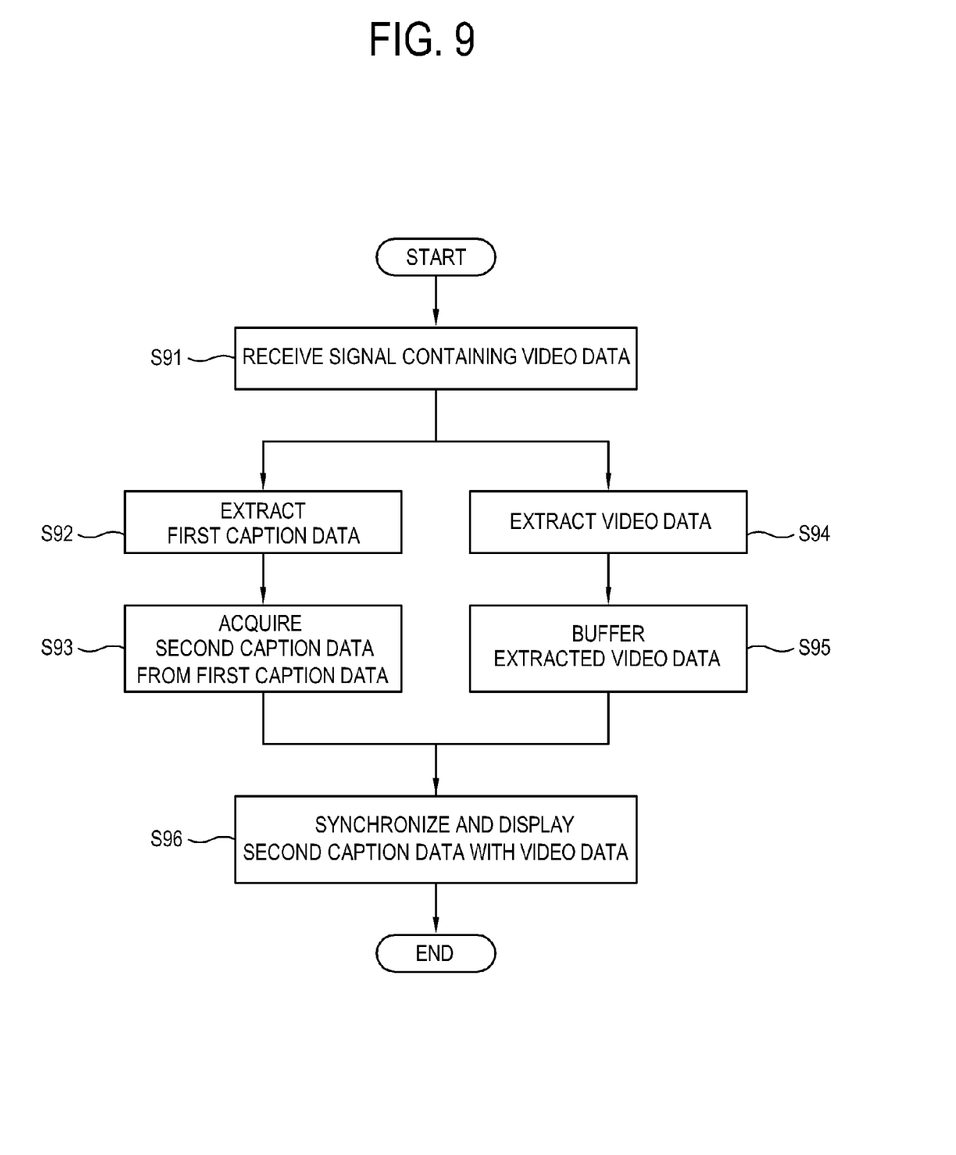
FIG. 9 is a flowchart showing operations of a display apparatus according to an exemplary embodiment.

FIG. 9 is a flowchart showing operations of a display apparatus 1 according to an exemplary embodiment. At operation S91, the display apparatus 1 receives a signal containing the video data. At operation S92, the display apparatus 1 extracts the first caption data from the signal. At operation S93, the display apparatus 1 acquires the second caption data from the first caption data. At operation S94, concurrently with the operations S92 and S93, the display apparatus 1 extracts the video data from the signal. At operation S95, the display apparatus 1 buffers the extracted video data. At operation S96, the display apparatus 1 synchronizes the second caption data with the video data corresponding to the second caption data and displays them.

Figure 10:
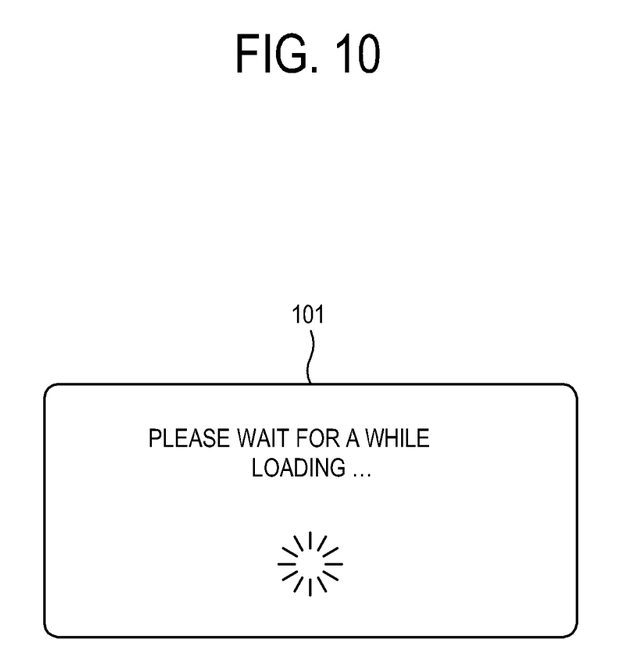
FIG. 10 shows an example of a graphic user interface (GUI) displayed by a display apparatus according to an exemplary embodiment.

FIG. 10 shows an example of a graphic user interface (GUI) displayed by a display apparatus 1 according to an exemplary embodiment. The display apparatus 1 may further include a graphic engine for processing a graphic user interface (GUI) 101. Under control of the controller 45, the graphic engine may display the GUI 101, which informs a user that the image is being processed, on the display 43 in consideration of a user's convenience while the second caption data is acquired from and synchronized with the first caption data (that is, during the shifted time as shown in FIG. 8) until the image is initially displayed after receiving the signal.

As described above, according to an exemplary embodiment, the caption can be exactly synchronized with the image or the sound and displayed even though time is taken in processing the caption.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

What is claimed is:

1. A display apparatus comprising:
   a signal receiver which receives a signal containing video data for displaying a series of frames;
   a first data extractor which extracts first caption data from the signal;
   a data acquirer which acquires second caption data based on the extracted first caption data;
   a second data extractor which extracts the video data from the signal;
   a buffering section which buffers the extracted video data;
   a synchronizer which synchronizes the acquired second caption data with a frame corresponding to relevant caption data among frames of the buffered video data; and
   a display which displays the frame synchronized with the second caption data,
   wherein the data acquirer comprises a communicator which transmits the first caption data to a server, connected to the display apparatus through a network, and receives the second caption data from the server.

2. The display apparatus according to claim 1, wherein the signal comprises the encoded first caption data, and the first data extractor comprises a caption decoder which decodes the encoded first caption data and thereby extracts the first caption data.

3. The display apparatus according to claim 1, wherein the first data extractor comprises a character recognizer which recognizes the first caption data in the frames of the video data.

4. The display apparatus according to claim 1, wherein the second caption data comprises data of a translation of a caption included in the first caption data.

5. The display apparatus according to claim 1, wherein the signal receiver comprises a tuner which receives a broadcast signal corresponding to one among a plurality of channels.

6. The display apparatus according to claim 1, wherein the signal receiver comprises a connector, connected to a set-top box, and which receives the signal from the set-top box.

7. The display apparatus according to claim 1, further comprising a sound output section which synchronizes a sound, corresponding to the first caption data, with the frame and outputs the sound.

8. A method of controlling a display apparatus, the method comprising:
   receiving a signal containing video data for displaying a series of frames;
   extracting first caption data from the signal;
   acquiring second caption data based on the extracted first caption data;
   extracting the video data from the signal;
   buffering the extracted video data;
   synchronizing the acquired second caption data with a frame corresponding to relevant caption data among frames of the buffered video data, and displaying the synchronized frame,
   wherein the acquiring the second caption data comprises:
   transmitting the first caption data to a server connected to the display apparatus through a network; and
   receiving the second caption data from the server.

9. The method according to claim 8, wherein
   the signal comprises the encoded first caption data, and
   the extracting the first caption data comprises decoding the encoded first caption data and thereby extracting the first caption data.

10. The method according to claim 8, wherein the extracting the first caption data comprises obtaining the first caption data from the frames of the video data.

11. The method according to claim 8, wherein the second caption data comprises data of a translation of a caption included in the first caption data.

12. The method according to claim 8, wherein the receiving the signal comprises receiving a broadcast signal corresponding to one channel among a plurality of channels.

13. The method according to claim 8, wherein the receiving the signal comprises receiving the signal from a set-top box connected to the display apparatus.

14. The method according to claim 8, further comprising synchronizing a sound, corresponding to the first caption data, with the frame and outputting the sound.

15. A method of displaying video data, the method comprising:
   receiving a signal comprising video data and first caption data, wherein the first caption data is data of a first caption;
   using the first caption data to acquire second caption data, wherein the second caption data is data of a translation of the first caption;
   synchronizing the second caption data with one or more frames of the video data; and
   displaying the second caption data simultaneously with the one or more frames,
   wherein using the first caption data to acquire the second caption data comprises:
   transmitting the first caption data to a server connected to the display apparatus through a network; and
   receiving the second caption data from the server.

16. The method according to claim 15, further comprising:
   synchronizing a sound corresponding to the second caption data and the one or more frames; and
   outputting the sound simultaneously with the displaying the second caption data with the one or more frames.

* * * * *